(12) United States Patent
Siwicki

(10) Patent No.: US 10,780,931 B2
(45) Date of Patent: Sep. 22, 2020

(54) KICKSTAND ASSEMBLY

(71) Applicant: Ronald Siwicki, Brighton, MI (US)

(72) Inventor: Ronald Siwicki, Brighton, MI (US)

( * ) Notice: Subject to any disclaimer, the term of this patent is extended or adjusted under 35 U.S.C. 154(b) by 187 days.

(21) Appl. No.: 15/985,250

(22) Filed: May 21, 2018

(65) Prior Publication Data

US 2019/0351962 A1  Nov. 21, 2019

(51) Int. Cl.
| | | |
|---|---|---|
| *B62H 1/02* | (2006.01) | |
| *B62H 1/06* | (2006.01) | |
| *F15B 7/06* | (2006.01) | |
| *F15B 1/26* | (2006.01) | |

(52) U.S. Cl.
CPC ............... *B62H 1/06* (2013.01); *F15B 1/26* (2013.01); *F15B 7/06* (2013.01); *F15B 2215/30* (2013.01)

(58) Field of Classification Search
CPC ........................................................ B62H 1/06
USPC ........................................................ 280/304
See application file for complete search history.

(56) References Cited

U.S. PATENT DOCUMENTS

| | | | |
|---|---|---|---|
| 4,223,906 A | | 9/1980 | Gratza |
| 4,580,804 A | | 4/1986 | Weber |
| 5,234,225 A | | 8/1993 | Yaple |
| D349,386 S | | 8/1994 | Piebenga |
| 5,358,265 A | * | 10/1994 | Yaple ................. B62H 1/02 280/293 |
| 5,388,848 A | | 2/1995 | Silva et al. |
| 6,340,166 B1 | * | 1/2002 | Rethman ............. B62H 1/00 248/188.9 |
| 6,715,282 B1 | | 4/2004 | Doveri |
| 6,845,999 B2 | * | 1/2005 | Royal, Sr. .......... B62H 1/12 280/304 |
| 8,425,895 B2 | * | 4/2013 | Wang ................ C07K 14/56 424/85.7 |
| 2002/0014766 A1 | * | 2/2002 | Leppke ............... B62H 1/02 280/763.1 |
| 2010/0013186 A1 | * | 1/2010 | Markie ............... B62H 1/06 280/297 |
| 2012/0056403 A1 | * | 3/2012 | Lian ................... B62H 1/12 280/304 |
| 2012/0139208 A1 | * | 6/2012 | Tu ....................... B62H 1/06 280/293 |
| 2012/0181776 A1 | * | 7/2012 | VanValkenburgh .... B25B 13/04 280/304 |

* cited by examiner

*Primary Examiner* — Tony H Winner

(57) ABSTRACT

A kickstand assembly for a motorcycle includes a motorbike and a housing. The housing defines an interior space and is coupled to an end of a frame of the motorbike. A plurality of rods is positioned in the interior space. Each rod is selectively extensible from a bottom of the housing. An actuator is coupled to the housing and is positioned in the interior space. The actuator is operationally coupled to the plurality of rods. The actuator is positioned to selectively urge the rods to extend from the housing so that a terminus of each rod contacts a surface upon which the motorbike is positioned. The motorbike is stabilized on the surface.

14 Claims, 4 Drawing Sheets

KICKSTAND ASSEMBLY

STATEMENT REGARDING FEDERALLY SPONSORED RESEARCH OR DEVELOPMENT

Not Applicable

CROSS-REFERENCE TO RELATED APPLICATIONS

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to kickstand assemblies and more particularly pertains to a new kickstand assembly for a motorcycle.

BRIEF SUMMARY OF THE INVENTION

An embodiment of the disclosure meets the needs presented above by generally comprising a motorbike and a housing. The housing defines an interior space and is coupled to an end of a frame of the motorbike. A plurality of rods is positioned in the interior space. Each rod is selectively extensible from a bottom of the housing. An actuator is coupled to the housing and is positioned in the interior space. The actuator is operationally coupled to the plurality of rods. The actuator is positioned to selectively urge the rods to extend from the housing so that a terminus of each rod contacts a surface upon which the motorbike is positioned. The motorbike is stabilized on the surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
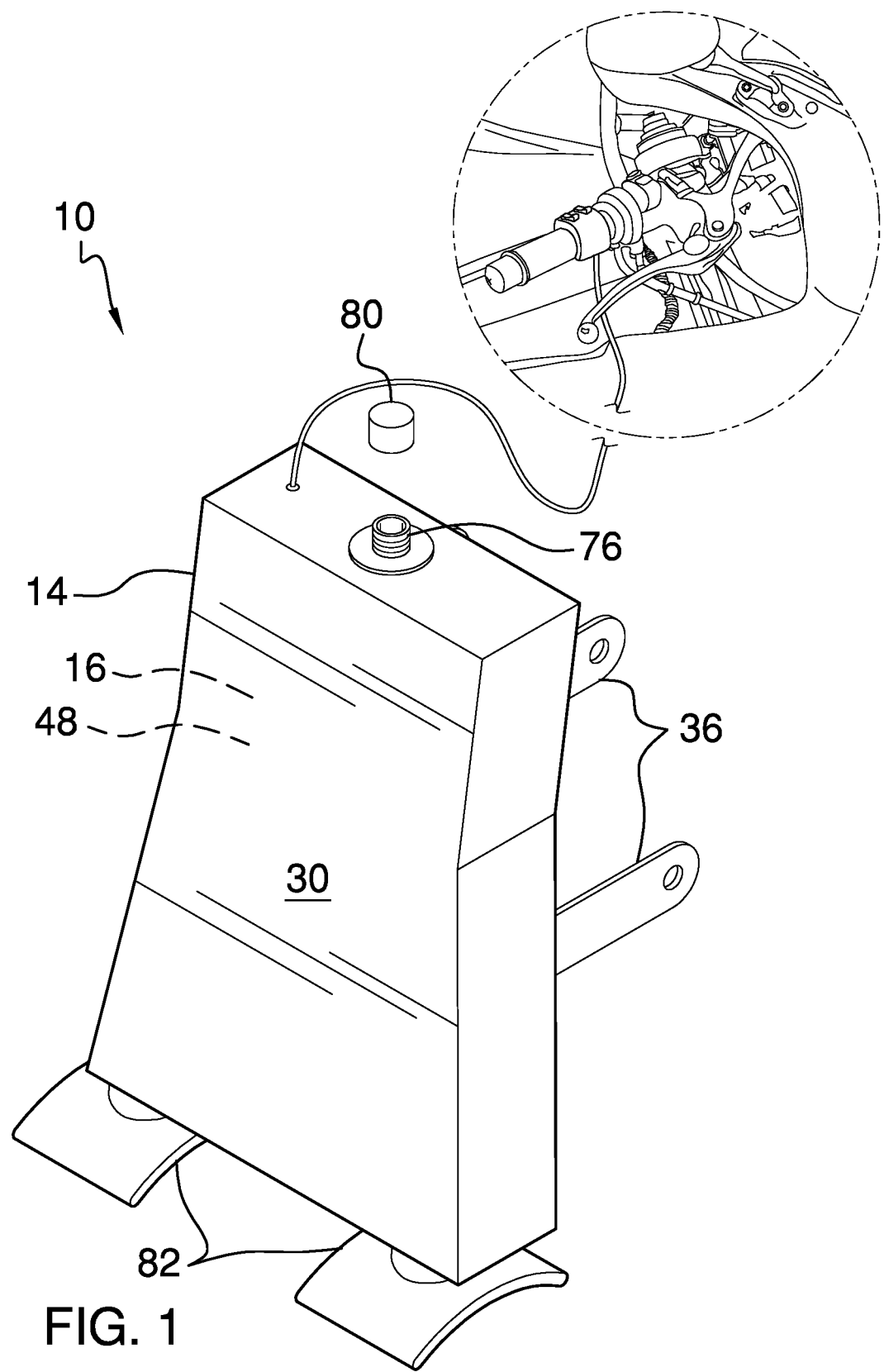
FIG. 1 is an isometric perspective view of a kickstand assembly according to an embodiment of the disclosure.

With reference now to the drawings, and in particular to FIGS. 1 through 5 thereof, a new kickstand assembly embodying the principles and concepts of an embodiment of the disclosure and generally designated by the reference numeral 10 will be described.

Figure 4:
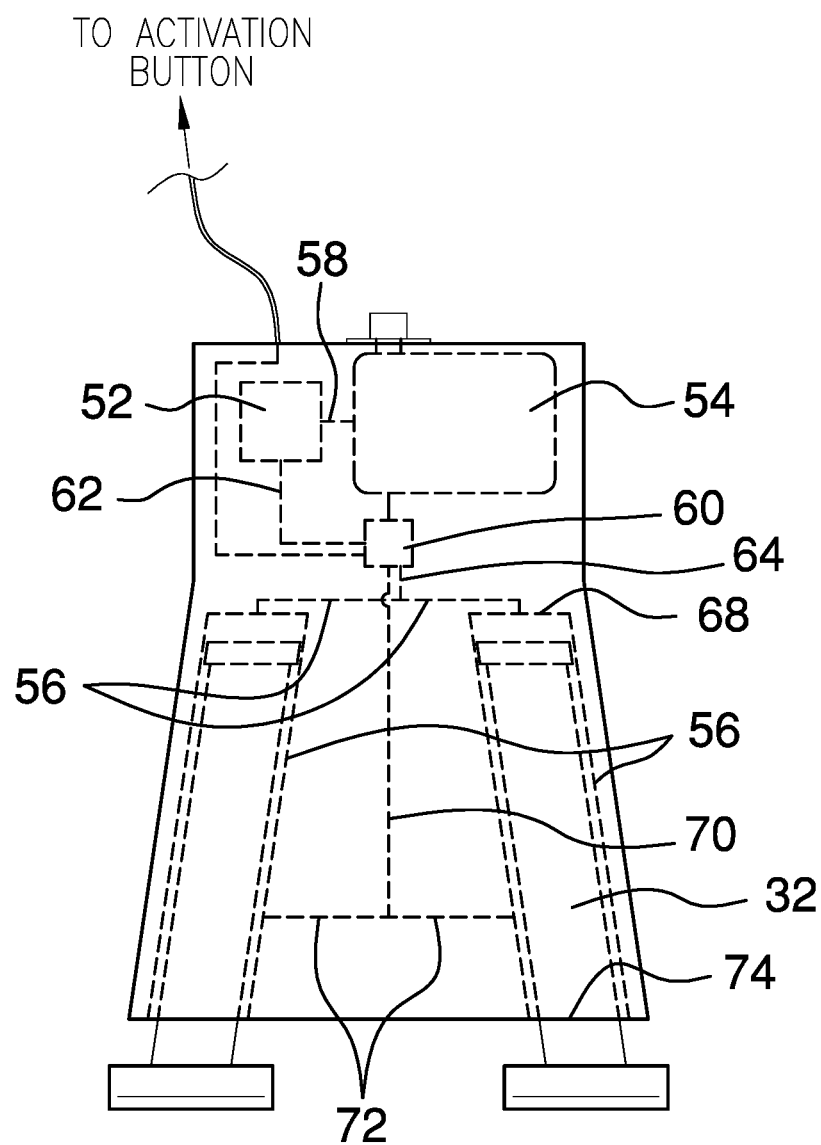
FIG. 4 is a front view of an embodiment of the disclosure.
Figure 5:
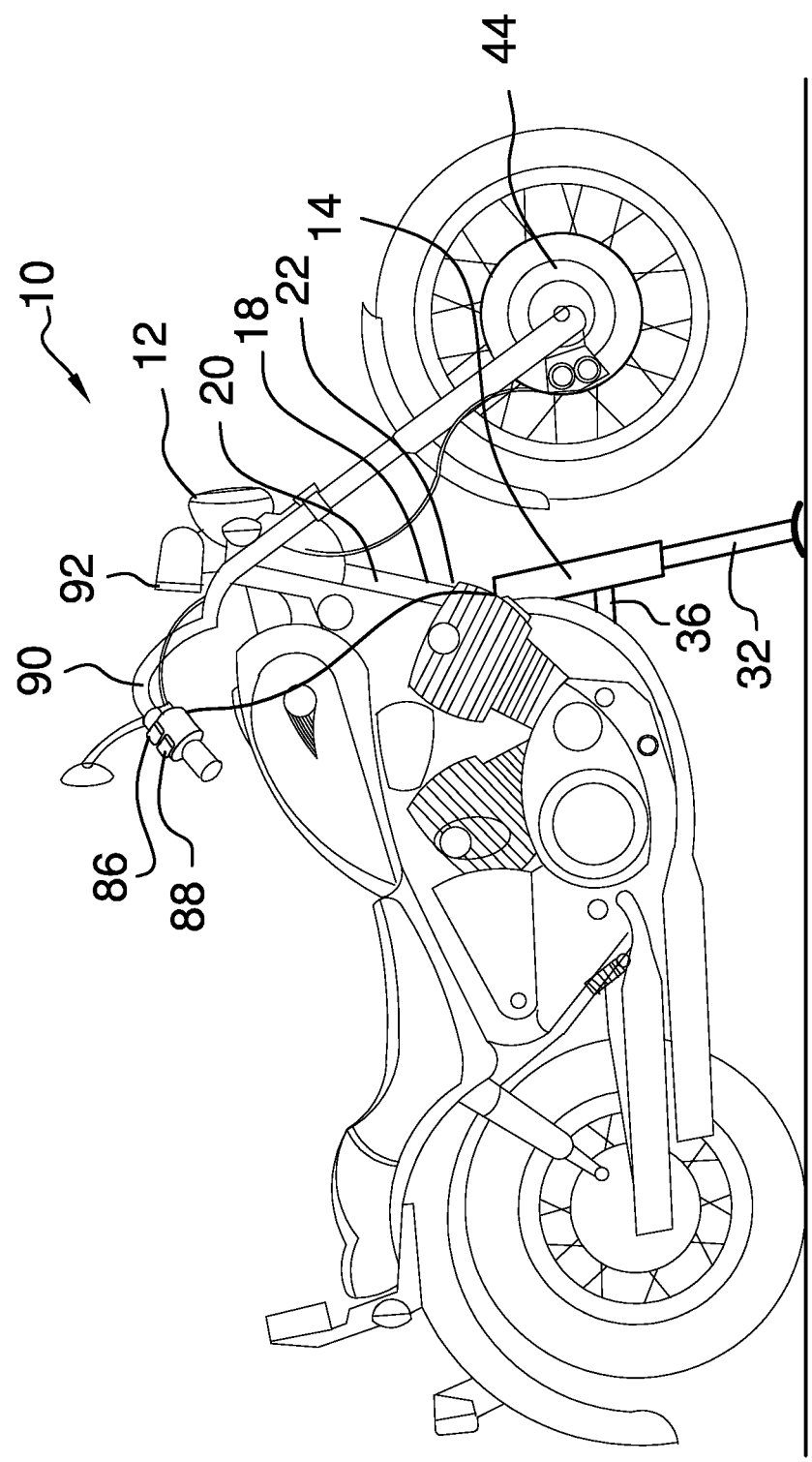
FIG. 5 is an in-use view of an embodiment of the disclosure.

As best illustrated in FIGS. 1 through 5, the kickstand assembly 10 generally comprises a motorbike 12 and a housing 14. The housing 14 defines an interior space 16 and is coupled to an end 18 of a frame 20 of the motorbike 12. The housing 14 is coupled to a front end 22 of the frame 20, as shown in FIG. 5.

The housing 14 comprises an upper section 24 and a lower section 26. The upper section 24 is substantially rectangularly box shaped. The lower section 26 has opposing sides 28 that extend transversely from the upper section 24 so that the lower section 26 is trapezoidally shaped when viewed from a front face 30 of the housing 14.

A plurality of rods 32 is positioned in the interior space 16. Each rod 32 is selectively extensible from a bottom 34 of the housing 14. The plurality of rods 32 comprises two rods 32 that are positioned singly proximate to the opposing sides 28 of the lower section 26 of the housing 14 so that the rods 32 extend outwardly from the frame 20.

Each of a plurality of brackets 36 is coupled to and extends between a rear face 38 of the housing 14 and the frame 20. The plurality of brackets 36 comprises a pair of upper braces 40 and a pair of lower braces 42. The lower braces 42 are dimensionally longer than the upper braces 40 so that the rods 32 extend from the housing 14 toward a front wheel 44 of the motorbike 12, as shown in FIG. 5.

Each of a plurality of holes 46 is positioned in a respective bracket 36 distal from the housing 14. The holes 46 are configured to insert mounting hardware to couple the housing 14 to the motorbike 12.

An actuator 48 is coupled to the housing 14 and is positioned in the interior space 16. The actuator 48 is operationally coupled to the plurality of rods 32. The actuator 48 is positioned to selectively urge the rods 32 to extend from the housing 14 so that a terminus 50 of each rod 32 contacts a surface upon which the motorbike 12 is positioned to stabilize the motorbike 12 on the surface.

The actuator 48 comprises a pump 52, a reservoir 54, and a plurality of hydraulic cylinders 56, as shown in FIG. 4. The reservoir 54 is coupled to the pump 52 by a first tube 58 so that the reservoir 54 is in fluidic communication with the pump 52. A valve 60 is coupled by a second tube 62 to the pump 52 so that the valve 60 is in fluidic communication with the pump 52. Each hydraulic cylinder 56 comprises a respective rod 32. The hydraulic cylinders 56 are double-acting type so that each hydraulic cylinder 56 is positioned to selectively push and pull the respective rod 32.

A first hose 64 is coupled to and extends from the valve 60. Each of a plurality of third tubes 66 is coupled to and extends between the first hose 64 and an upper end 68 of a respective hydraulic cylinder 56 so that the respective hydraulic cylinder 56 is in fluidic communication with the valve 60. The valve 60 is positioned to selectively couple the third tubes 66 to the pump 52 to extend the rods 32. The rods 32 contact the surface and raise the front wheel 44 from the surface, as shown in FIG. 5.

A second hose 70 is coupled to and extends from the valve 60. Each of a plurality of fourth tubes 72 is coupled to and extends between the second hose 70 and proximate to a lower end 74 of the respective hydraulic cylinder 56 so that the respective hydraulic cylinder 56 is in fluidic communication with the valve 60. The valve 60 is positioned to selectively couple the fourth tubes 72 to the pump 52 to retract the rods 32.

Figure 2:
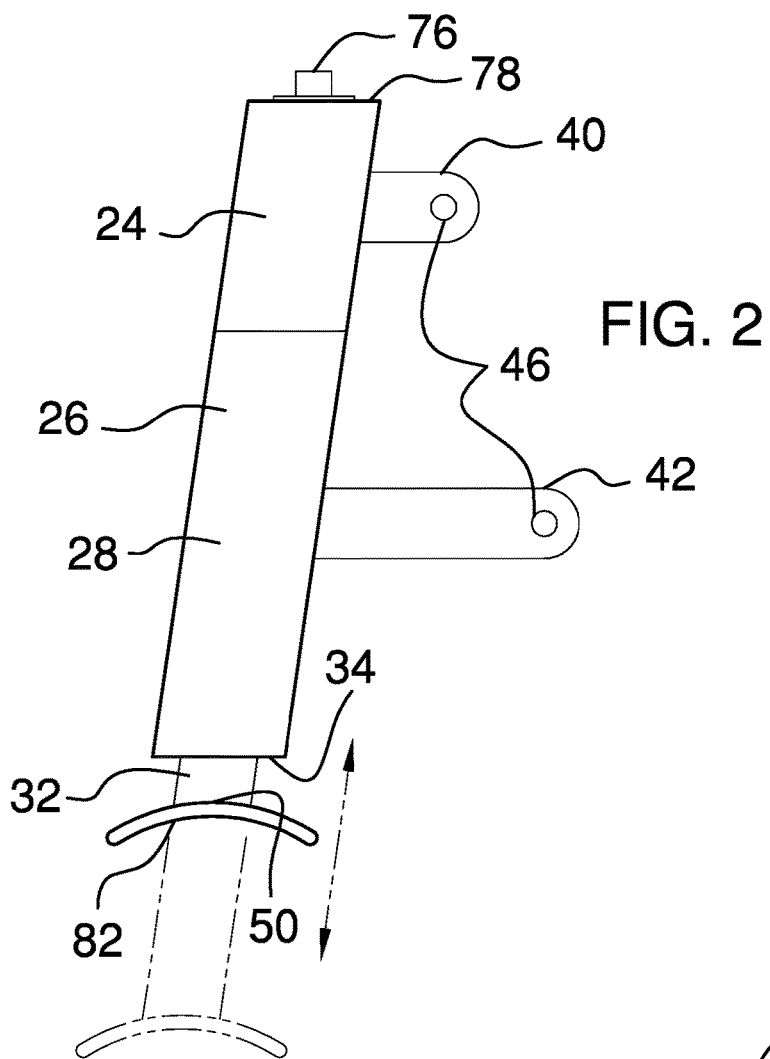
FIG. 2 is a side view of an embodiment of the disclosure.
Figure 3:
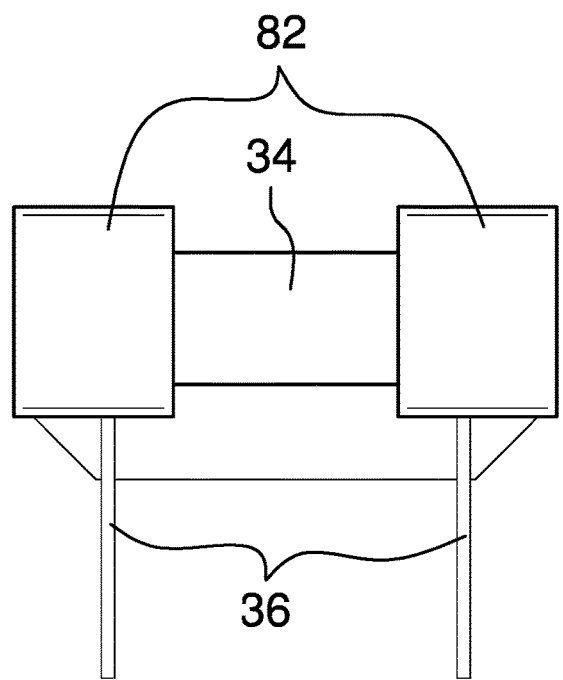
FIG. 3 is a bottom view of an embodiment of the disclosure.

A pipe 76 is coupled to and extends from the reservoir 54, as shown in FIGS. 1 and 2. The pipe 76 protrudes through a top 78 of the housing 14. The pipe 76 is configured to add fluid to the reservoir 54. The pipe 76 is externally threaded distal from the reservoir 54. A cap 80, which is complementary the pipe 76, is positioned to threadedly couple to the pipe 76 to close the pipe 76.

Each of a plurality of plates 82 is coupled to the terminus 50 of a respective rod 32 distal from the housing 14. The plate 82 is configured to abut the surface when the rod 32 is extended from the housing 14. The plate 82 is arcuate, as shown in FIG. 2.

A controller 84 is coupled to the motorbike 12. The controller 84 is operationally coupled to the actuator 48. The controller 84 is positioned to selectively actuate the actuator 48 to selectively urge the rods 32 to extend from the housing 14. The terminus 50 of each rod 32 contacts the surface upon which the motorbike 12 is positioned to stabilize the motorbike 12 on the surface. The controller 84 also is positioned to selectively actuate the actuator 48 to retract the rods 32 into the housing 14. The assembly 10 obviates the need of a user to balance the motorbike 12 with one leg while attempting to manipulate a manual kickstand with a foot of the other leg.

The controller 84 comprises a first button 86 and a second button 88. The first button 86 and the second button 88 are depressible. The first button 86 is configured to be depressed to actuate the actuator 48 to extend the rods 32. The second button 88 is configured to be depressed to actuate the actuator 48 to retract the rods 32. In one embodiment, as shown in FIGS. 1 and 5, the controller 84 is mounted to a handlebar 90 of the motorbike 12. In another embodiment, the controller 84 is integral to an instrument panel 92 of the motorbike 12.

The present invention anticipates the assembly 10 being integral to a new motorcycle and couplable to a used motorcycle.

In use, the first button 86 is depressed to actuate the actuator 48 to extend the rods 32. The rods 32 contact the surface and raise the front wheel 44 from the surface, stabilizing the motorbike 12. The second button 88 is depressed to actuate the actuator 48 to retract the rods 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A kickstand assembly comprising:
    a motorbike;
    a housing defining an interior space, said housing being coupled to one end of a frame of said motorbike, wherein the one end is a front end of said frame;
    a plurality of rods positioned in said interior space, each rod being selectively extensible from a bottom of said housing;
    an actuator coupled to said housing and positioned in said interior space, said actuator being operationally coupled to said plurality of rods wherein said actuator is positioned for selectively urging said rods for extending from said housing such that a terminus of each said respective rod contacts a surface upon which said motorbike is positioned for stabilizing said motorbike on the surface; and
    said housing comprising an upper section and a lower section, said upper section being substantially rectangularly box shaped, said lower section having opposing sides extending transversely from said upper section such that said lower section is trapezoidally shaped when viewed from a front face of said housing.

2. The assembly of claim 1, further including a plurality of plates, each plate being coupled to said terminus of each said respective rod distal from said housing wherein said plate is configured for abutting the surface when each said respective rod is extended from said housing.

3. The assembly of claim 2, further including said plate being arcuate.

4. The assembly of claim 1, wherein said plurality of rods comprising two rods positioned singly proximate to said opposing sides of said lower section of said housing such that said rods extend outwardly from said frame.

5. The assembly of claim 1, further including a plurality of brackets, each bracket being coupled to and extending between a rear face of said housing and said frame.

6. The assembly of claim 5, wherein said plurality of brackets comprising a pair of upper braces and a pair of lower braces, said lower braces being dimensionally longer than said upper braces such that said rods extend from said housing toward a front wheel of said motorbike.

7. The assembly of claim 5, further including a plurality of holes, each hole being positioned in each said respective bracket distal from said housing wherein said holes are configured for inserting mounting hardware for coupling said housing to said frame.

8. The assembly of claim 1, further including said actuator comprising:
a pump;
a reservoir coupled by a first tube to said pump such that said reservoir is in fluidic communication with said pump;
a valve coupled by a second tube to said pump such that said valve is in fluidic communication with said pump;
a plurality of hydraulic cylinders, each hydraulic cylinder comprising said respective rod, said hydraulic cylinders being double-acting type wherein each said hydraulic cylinder is positioned for selectively pushing and pulling said respective said rod,
a first hose coupled to and extending from said valve;
a plurality of third tubes, each third tube being coupled to and extending between said first hose and an upper end of said respective hydraulic cylinder such that said respective hydraulic cylinder is in fluidic communication with said valve wherein said valve is positioned for selectively coupling said third tubes to said pump for extending said rods such that said rods contact the surface and raise said front wheel from the surface;
a second hose coupled to and extending from said valve; and
a plurality of fourth tubes, each fourth tube being coupled to and extending between said second hose and proximate to a lower end of said respective hydraulic cylinder such that said respective hydraulic cylinder is in fluidic communication with said valve wherein said valve is positioned for selectively coupling said fourth tubes to said pump for retracting said rods.

9. The assembly of claim 8, further comprising:
a pipe coupled to and extending from said reservoir such that said pipe protrudes through a top of said housing wherein said pipe is configured for adding fluid to said reservoir, said pipe being externally threaded distal from said reservoir; and
a cap complementary said pipe wherein said cap is positioned for threadedly coupling to said pipe for closing said pipe.

10. The assembly of claim 1, further including a controller coupled to said motorbike, said controller being operationally coupled to said actuator wherein said controller is positioned for selectively actuating said actuator for selectively urging said rods for extending from said housing such that said terminus of each said respective rod contacts the surface upon which said motorbike is positioned for stabilizing said motorbike on the surface.

11. The assembly of claim 10, wherein said controller comprising a first button and a second button, said first button and said second button being depressible wherein said first button is configured for depressing for actuating said actuator for extending said rods and wherein said second button is configured for depressing for actuating said actuator for retracting said rods.

12. The assembly of claim 11, further including said controller being mounted to a handlebar of said motorbike.

13. A kickstand assembly comprising:
a motorbike;
a housing defining an interior space, said housing being coupled to a front end of said frame, said housing comprising an upper section and a lower section, said upper section being substantially rectangularly box shaped, said lower section having opposing sides extending transversely from said upper section such that said lower section is trapezoidally shaped when viewed from a front face of said housing;
at least two rods positioned in said interior space, each of the at least two rods being selectively extensible from a bottom of said housing, said at least two rods positioned singly proximate to said opposing sides of said lower section of said housing such that said at least two rods extend outwardly from said frame;
a plurality of brackets, each bracket being coupled to and extending between a rear face of said housing and said frame, said plurality of brackets comprising a pair of upper braces and a pair of lower braces, said lower braces being dimensionally longer than said upper braces such that said at least two rods extend from said housing toward a front wheel of said motorbike;
a plurality of holes, each hole being positioned in said respective bracket distal from said housing wherein said holes are configured for inserting mounting hardware for coupling said housing to said motorbike;
an actuator coupled to said housing and positioned in said interior space, said actuator being operationally coupled to said at least two rods wherein said actuator is positioned for selectively urging said at least two rods for extending from said housing such that a terminus of said respective rod contacts a surface upon which said motorbike is positioned for stabilizing said motorbike on the surface, said actuator comprising:
a pump,
a reservoir coupled by a first tube to said pump such that said reservoir is in fluidic communication with said pump,
a valve coupled by a second tube to said pump such that said valve is in fluidic communication with said pump,
a plurality of hydraulic cylinders, each hydraulic cylinder comprising said respective rod, said hydraulic cylinders being double-acting wherein each said respective hydraulic cylinder is positioned for selectively pushing and pulling said respective rod,
a first hose coupled to and extending from said valve,
a plurality of third tubes, each third tube being coupled to and extending between said first hose and an upper end of said respective hydraulic cylinder such that said respective said hydraulic cylinder is in fluidic communication with said valve wherein said valve is positioned for selectively coupling said third tubes to said pump for extending said rods such that said rods contact the surface and raise said front wheel from the surface,
a second hose coupled to and extending from said valve, and
a plurality of fourth tubes, each fourth tube being coupled to and extending between said second hose and proximate to a lower end of said respective hydraulic cylinder such that said respective hydraulic cylinder is in fluidic communication with said valve wherein said valve is positioned for selectively coupling said fourth tubes to said pump for retracting said rods;
a pipe coupled to and extending from said reservoir such that said pipe protrudes through a top of said housing wherein said pipe is configured for adding fluid to said reservoir, said pipe being externally threaded distal from said reservoir;

a cap complementary said pipe wherein said cap is positioned for threadedly coupling to said pipe for closing said pipe;

a plurality of plates, each plate being coupled to said terminus of said respective rod distal from said housing wherein said plate is configured for abutting the surface when said respective rod is extended from said housing, said plate being arcuate; and a controller coupled to said motorbike, said controller being operationally coupled to said actuator wherein said controller is positioned for selectively actuating said actuator for selectively urging said at least two rods for extending from said housing such that said terminus of said respective rod contacts the surface upon which said motorbike is positioned for stabilizing said motorbike on the surface, said controller comprising a first button and a second button, said first button and said second button being depressible wherein said first button is configured for depressing for actuating said actuator for extending said at least two rods and wherein said second button is configured for depressing for actuating said actuator for retracting said at least two rods.

14. The assembly of claim 13, further including said controller being mounted to a handlebar of said motorbike.

* * * * *